(12) United States Patent
Kwong et al.

(10) Patent No.: US 7,540,000 B2
(45) Date of Patent: May 26, 2009

(54) OPTICAL DISK PRESENCE DETECTION METHOD AND APPARATUS

(75) Inventors: Wah Yiu Kwong, Beaverton, OR (US); Hong W. Wong, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 674 days.

(21) Appl. No.: 11/172,001

(22) Filed: Jun. 29, 2005

(65) Prior Publication Data

US 2007/0002707 A1 Jan. 4, 2007

(51) Int. Cl.
*G11B 15/52* (2006.01)

(52) U.S. Cl. .................................................... 720/600
(58) Field of Classification Search ................... None
See application file for complete search history.

(56) References Cited

U.S. PATENT DOCUMENTS

| 7,086,073 | B2 * | 8/2006 | Benedikt et al. | 720/719 |
| 2004/0052202 | A1 * | 3/2004 | Brollier | 369/273 |
| 2005/0274801 | A1 * | 12/2005 | Harding et al. | 235/438 |

* cited by examiner

*Primary Examiner*—Mark Blouin
(74) *Attorney, Agent, or Firm*—Schwabe, Williamson & Wyatt, P.C.

(57) ABSTRACT

An apparatus, method, and system for an optical disk drive integrating a radio-frequency identification (RFID) reader is disclosed herein.

9 Claims, 7 Drawing Sheets

OPTICAL DISK PRESENCE DETECTION METHOD AND APPARATUS

TECHNICAL FIELD

Embodiments of the present invention relate to the field of, but are not limited to, electronic devices, and in particular, to the field of optical disk drives.

BACKGROUND OF THE INVENTION

An optical disk drive may be included in an electronic or a computer system to access large amounts of data on an optical disk media by spinning and reading the optical disk media. The optical disk media may contain data in a variety of different forms and formats such as data for software applications, for a large database, or for audio or video play.

For example, the optical disk drive may be a Compact Disk Read-Only Memory type optical disk drive (CD-ROM). CD-ROM type optical disk drives may read an optical disk media typical for software data to be executed by a computer system or data for a database application of the computer.

Likewise, the optical disk drive may be a compact disk type optical disk drive (CD). CD type optical disk drives may read an optical disk media typical for storage of data representative of images and/or audio. Data of the CD optical disk media may be optically read by the CD type optical disk drive for presentation, display or play to a user for consumption.

Advancements in optical storage media have further led to Digital Versatile/Video Disk type optical disk drives (DVD). DVD type optical disk drives may read an optical disk media of capacity and bandwidth greater than CD's and CD-ROMs. For example, a DVD optical disk media may retain information of a full-length film, which might be formatted with an MPEG (Moving Picture Experts Group) video format. Optical storage media will continue to advance as optical storage technology is further developed; for example, the term optical disk media as used herein refers to currently existing optical disk media as well as still to be developed optical disk media such as Blu-Ray laser and the like.

The operation of the optical disk drive during the spinning and reading the optical disk media requires a given amount of power consumption. Portable computers also often include structure for reducing their power consumption in order to increase the length of time they can run based on battery power, their so-called run time. Power consumption in such a portable computer can be reduced by terminating the supply of power to various devices in the portable computer. This can typically include turning off the display, stopping the hard drive, and other such features.

Additionally, computers systems including optical disk drives typically include some form of authenticating optical disk media. This authentication of the optical disk media is typically utilized to reduce piracy of the contents of the optical disk media.

BRIEF DESCRIPTION OF THE DRAWINGS

Embodiments of the invention are illustrated by way of example and not by way of limitation in the figures of the accompanying drawings, in which the like references indicate similar elements and in which.

DETAILED DESCRIPTION OF ILLUSTRATIVE EMBODIMENTS OF THE INVENTION

An apparatus, method, and system for embodiments of an optical disk drive integrating a radio-frequency identification (RFID) reader are disclosed herein. In the following detailed description, reference is made to the accompanying drawings which form a part hereof wherein like numerals designate like parts throughout, and in which is shown by way of illustration specific embodiments in which the invention may be practiced. It is to be understood that other embodiments may be utilized and structural or logical changes may be made without departing from the scope of the embodiments of the present invention. It should also be noted that directions and references (e.g., up, down, top, bottom, etc.) may be used to facilitate the discussion of the drawings and are not intended to restrict the application of the embodiments of this invention. Therefore, the following detailed description is not to be taken in a limiting sense and the scope of the embodiments of the present invention is defined by the appended claims and their equivalents.

Figure 1:
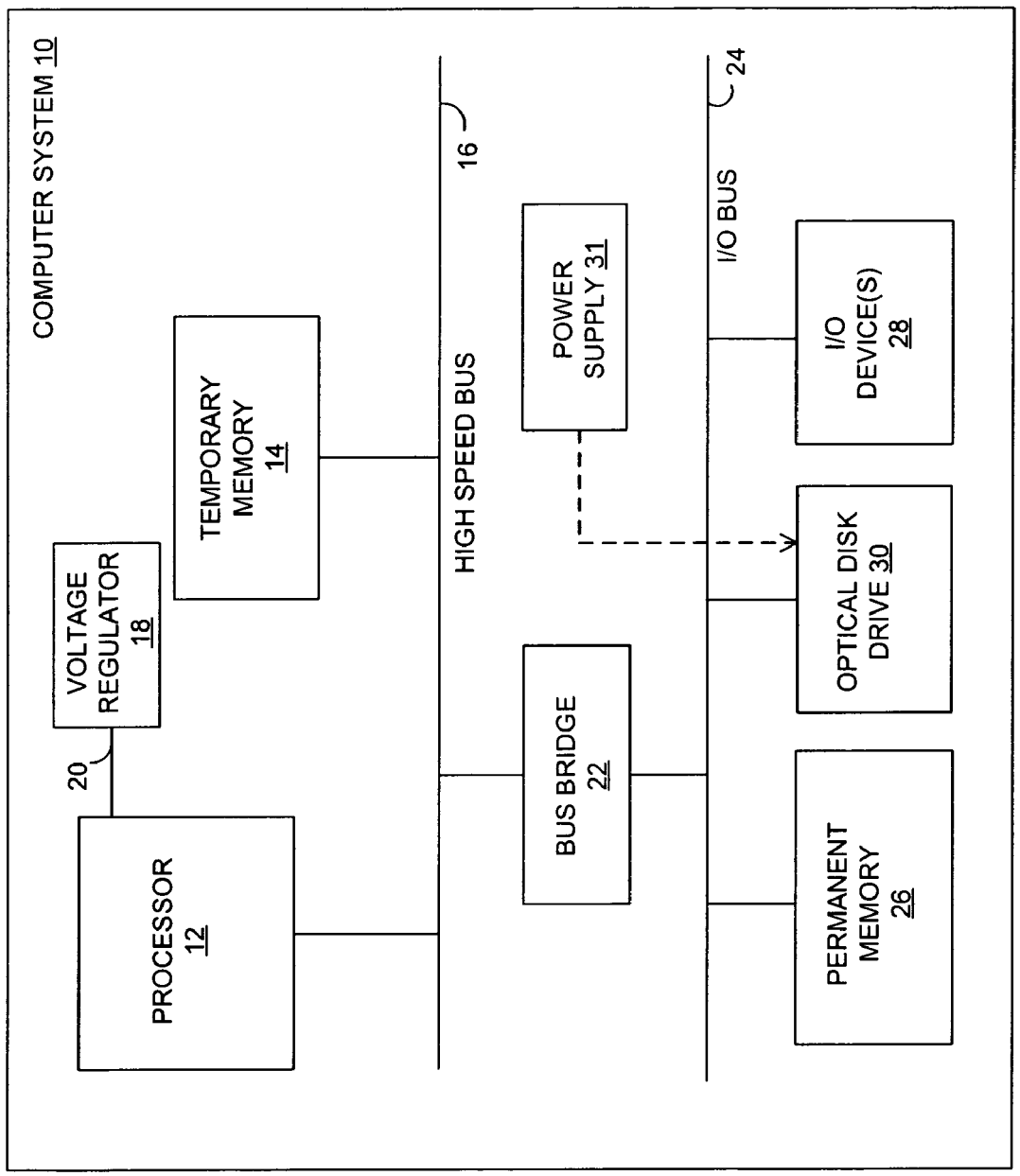
FIG. 1 is a schematic diagram illustrating an example computer system including an optical disk drive in accordance with an embodiment of the present invention.

FIG. 1 illustrates a block diagram of one of many possible computer systems 10 in which embodiments of the present invention may be used. As shown, the computer system 10 includes a processor 12, such as an integrated circuit, and temporary memory 14, such as synchronous dynamic random access memory (SDRAM) and DRAM, coupled to high-speed bus 16. Voltage regulator 18 may be utilized to provide power to processor 12 via traces 20. The high-speed bus 16 is connected through bus bridge 22 to input/output (I/O) bus 24. I/O bus 24 connects permanent memory 26, such as flash devices and mass storage device (e.g. fixed disk device), and I/O devices 28 to each other and bus bridge 22. In various embodiments, system 10 may be a set-top box, a digital camera, a CD player, a DVD player, a wireless mobile phone, a tablet computing device, or a laptop computing device.

An optical disk drive 30 may be connected to the various components of the computer system 10 via I/O bus 24. A power supply 31 may supply the optical disk drive 30 with power from a battery (not shown) and/or from an external power line (not shown). In applications where the computer system 10 is a laptop computing device or other device dependent on battery power, the power usage of the optical disk drive 30 may significantly impact the power consumption and battery life of the power supply 31.

Figure 2:
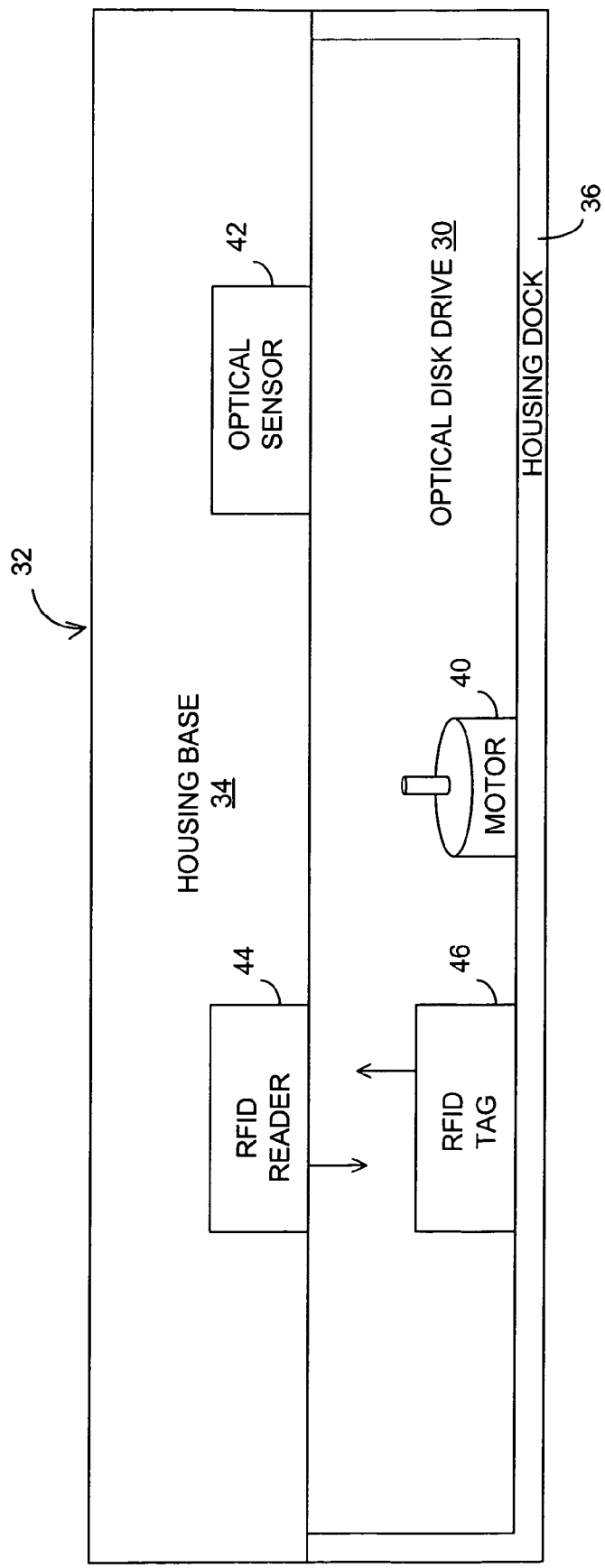
FIGS. 2-4 are schematic diagrams illustrating an example optical disk drive at various stages of operation, in accordance with an embodiment of the present invention.
Figure 3:
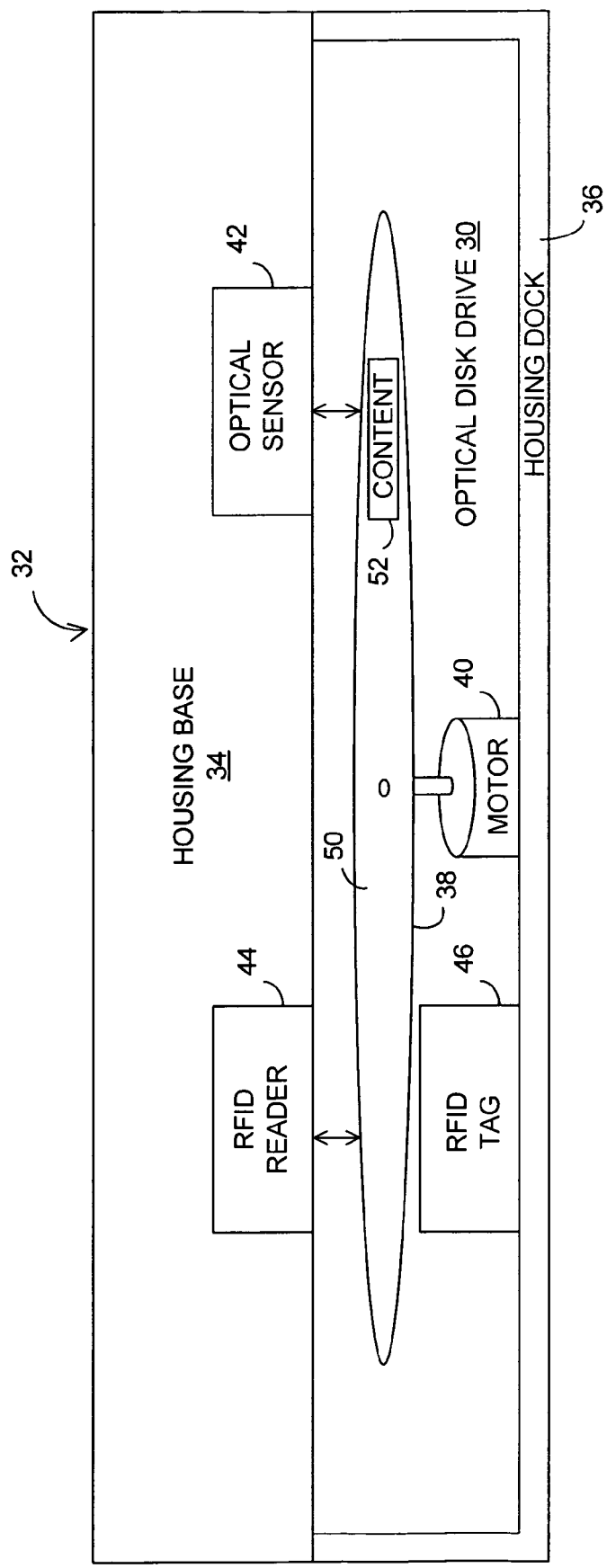

FIGS. 2 and 3 illustrate an example optical disk drive 30 at various stages of operation, in accordance with an embodiment of the present invention. A drive housing 32 may contain the optical disk drive 30. The drive housing 32 may include a stationary housing base 34 and an openable housing dock 36. The stationary housing base 34 may be adapted to be attached to the computer system 10 while the housing dock 36 may be adapted to open and close, providing access to the drive housing 32 for the insertion of an optical disk media 38 into the optical disk drive 30.

Once an optical disk media 38 is inserted into the optical disk drive 30, a motor 40 of the optical disk drive 30 may engage and rotate the optical disk media 38 at high speeds. While the optical disk media 38 is rotated, an optical sensor 42 of the optical disk drive 30 may sense data contained on the optical disk media 38.

A RFID reader 44 may be co-located within the drive housing 32 with the optical disk drive 30, or may be integrated with the optical disk drive 30 itself. The RFID reader 44 may be located on the housing base 34 portion of the drive housing 32. The RFID reader 44 may be any suitable RFID reader device, according to the requirements of the particular application. The RFID reader 44 may communicate with optical disk drive 30 and/or other components of the computer system 10 (such as a programmable logic controller) via any suitable interface, according to the requirements of the particular application.

An RFID tag 46 may be located within, or outside of, the drive housing 32 opposite the RFID reader 44. The RFID tag 46 may be located on the housing dock 36 portion of the drive housing 32. Alternatively, the RFID reader 44 and RFID tag 46 may have their locations reversed on the housing base 34 and housing dock 36 portions of the drive housing 32. The RFID tag 46 may be any suitable RFID device, according to the requirements of the particular application.

The RFID tag 46 may be positioned to permit communication with the RFID reader 44 when no optical disk media 38 is present within the optical disk drive 30, as illustrated in FIG. 2. Similarly, the RFID tag 46 may be positioned to be obscured from the RFID reader 44 when an optical disk media 38 is within the optical disk drive 30, as illustrated in FIG. 3. For example, the optical disk media 38 may include a shinning surface reflecting the signal from the RFID tag 46 so that the RFID tag 46 will not be detected by nor respond to the RFID reader 44. The optical disk media 38 may become an isolator filter between the RFID tag 46 and the RFID reader 44. In one embodiment, the RFID tag 46 may be positioned near the motor 40 so that smaller sized optical disk media 38 may still be detected within the optical disk drive 30.

Figure 4:
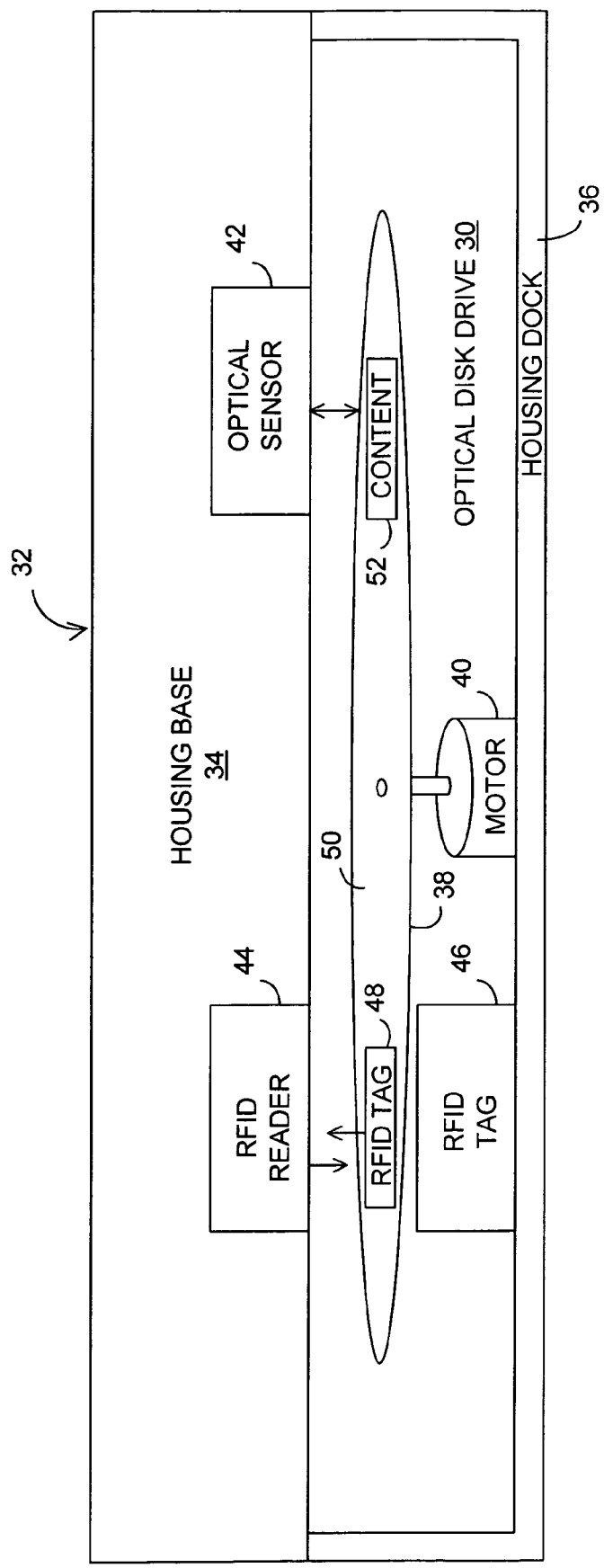

FIG. 4 illustrates an example optical disk drive 30, in accordance with an embodiment of the present invention. An RFID tag 48 may be disposed on a substrate 50 of the optical disk media 38. Content 52 may also be stored on the substrate 50 of the optical disk media 38. The content 52 may be configured for optical reading via the optical sensor 42 of the optical disk drive 30.

The RFID tag 48 on the optical disk media 38 may be positioned to be opposite the RFID reader 44 when the optical disk media 38 is within the optical disk drive 30. The RFID tag 48 may be positioned to permit communication with the RFID reader 44 when the optical disk media 38 is present within the optical disk drive 30, as illustrated in FIG. 4. The RFID tag 48 may be any suitable RFID device, according to the requirements of the particular application. Examples of suitable RFID tags 48 include, but are not limited to a Chipless RFID tag, a Fabric RFID tag, and the like.

Figure 5:
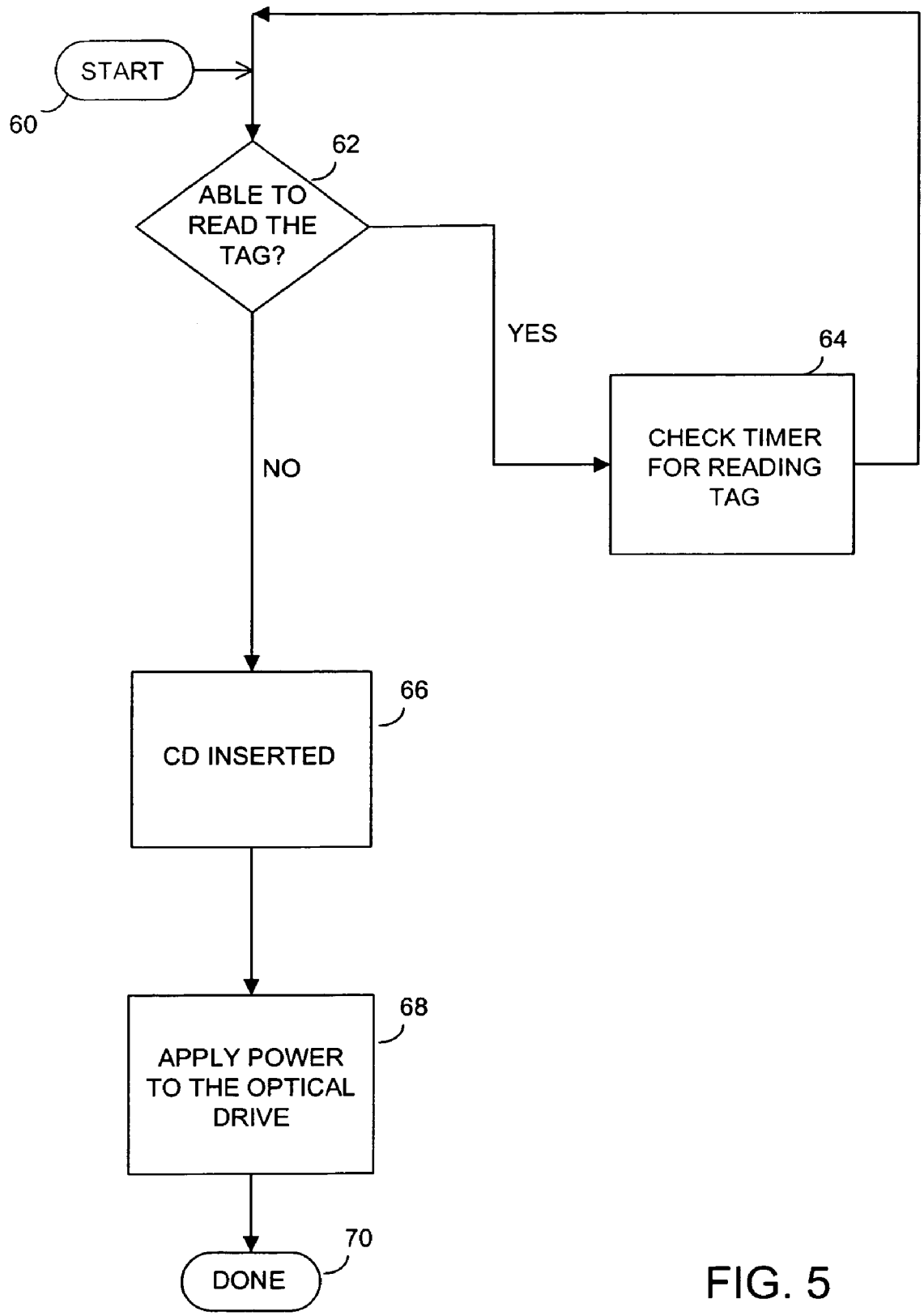
FIG. 5 is flow diagram illustrating a procedure to apply power to an optical disk drive, in accordance with an embodiment of the present invention.

FIG. 5 illustrates a procedure to apply power to an optical disk drive, in accordance with an embodiment of the present invention. A computer executable program logic is shown in FIG. 5, beginning in start block 60 and proceeding to decision block 62 where the RFID reader 44 may be activated to detect the presence of an optical disk media 38 within an optical disk drive 30. For instance, the RFID reader 44 may be activated to read the RFID tag 46, wherein the reading of the RFID tag 46 indicates the lack of an optical disk media 38 within an optical disk drive 30. Likewise, the RFID reader 44 may be activated to read the RFID tag 46, wherein the inability of the RFID reader 44 to read the RFID tag 46 indicates the presence the optical disk media 38 within an optical disk drive 30.

When the RFID reader 44 does not detect the presence of an optical disk media 38 within an optical disk drive 30 at decision block 62 (e.g. able to read RFID tag 46), the logic may proceed to block 64 where a timer may be checked. When the timer is satisfied, the logic may then proceed back to the beginning decision block 62, thus periodically repeating the operation of activating the RFID reader 44 to detect the presence of an optical disk media 38 within an optical disk drive 30 until the presence of an optical disk 38 within an optical disk drive 30 is detected by the RFID reader 44.

When the RFID reader 44 does detect the presence of an optical disk media 38 within an optical disk drive 30 at decision block 62 (e.g., unable to read RFID tag 46), the logic may proceed to block 66 where the status of the optical disk drive 30 containing the optical disk media 38 is established. From block 66, the logic may proceed to block 68 where power may be applied to the optical disk drive 30 as the presence of an optical disk media 38 within the optical disk drive 30 has been detected by the RFID reader 44. The logic then ends in block 70.

Figure 6:
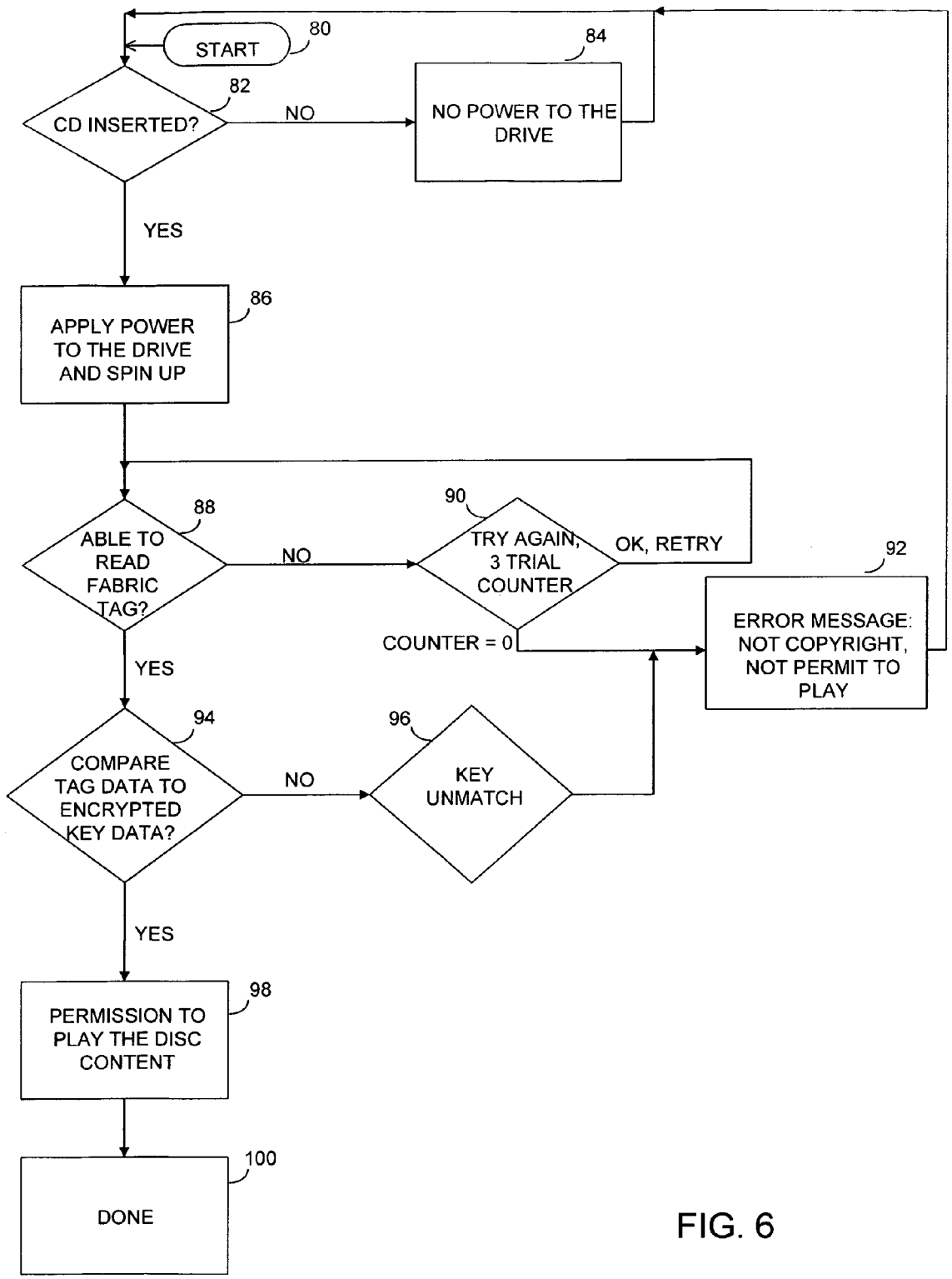
FIG. 6 is flow diagram illustrating a procedure to permit access to the contents of an optical disk media, in accordance with an embodiment of the present invention.

FIG. 6 illustrates a procedure to permit access to contents of an optical disk media, in accordance with an embodiment of the present invention. A computer executable program logic is shown in FIG. 6, beginning in start block 80 and proceeding to decision block 82 where the logic may determine if an the optical disk media 38 has been inserted. The decision block 82 may include the logic described above with respect to FIG. 5, or may alternatively be any other method of determining the presence of an the optical disk media 38. Where no optical disk media 38 is detected at decision block 82, the logic may proceed to block 84 where no power is supplied to the optical disk drive 30 and then back to the start block 80 of the logic.

Where an optical disk media 38 is detected at decision block 82, the logic may proceed to block 86 where power may be applied to the optical disk drive 30 spinning up the optical disk media 38. The logic may then proceed to decision block 88 where the RFID reader 44 may be activated to detect an RFID tag 48 on the optical disk media 38 within the optical disk drive 30.

Where no RFID tag 48 is detected by the RFID reader 44 at decision block 88, the logic may then proceed to decision block 90 where the logic may retry block 88 for a given number of trials (three trials for example). Once the trial counter of decision block 90 has been exceeded, the logic may then proceed to block 92 where an error message may be generated indicating that the optical disk media 38 within the optical disk drive 30 is not authenticated (e.g., does not match known copyright information) and/or that there is no permission to play this optical disk media 38. Accordingly, the block 92 may prevent access to the contents of the optical disk media 38 when the RFID reader 44 is unable to read an RFID tag 48 on the optical disk media 38.

Where an RFID tag 48 is detected by the RFID reader 44 at decision block 88, the logic may then proceed to decision block 94 where the logic may compare the data from the RFID tag 48 to stored data such as encrypted RFID key data, for example. Where the RFID tag 48 does not match the stored data at decision block 94, the logic proceeds to decision block 96 that may determine that there is no match with the stored data and may then proceed to block 92 where an error message may be generated indicating that the optical disk media 38 within the optical disk drive 30 is not authenticated (e.g., does not match known copyright information) and/or that there is no permission to play this optical disk media 38. Accordingly, the block 94 may prevent access to the contents of the optical disk media 38 when the RFID reader 44 reads an RFID tag 48 on the optical disk media 38 where the read RFID tag 48 does not match an approved RFID key.

Where the RFID tag 48 does match with the stored data at decision block 94, the logic proceeds to block 98 where permission to play the contents of the optical disk media 38 within the optical disk drive 30 may be given. Accordingly, the logic may permit access to the contents of the optical disk media 38 based at least in part on the reading of the RFID tag 48 by the RFID reader 44. The logic then ends in block 100.

Figure 7:
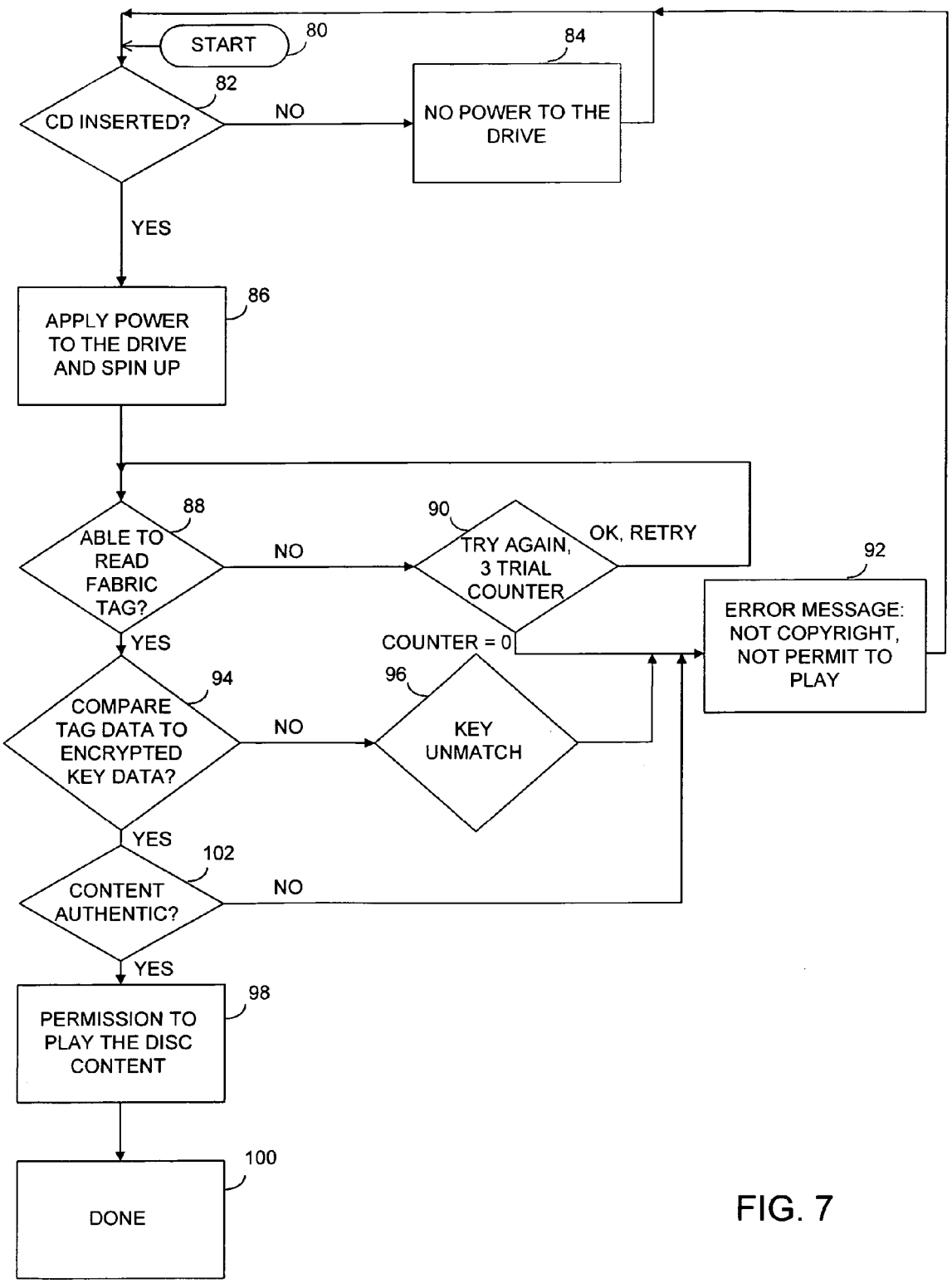
FIG. 7 is flow diagram illustrating another procedure to permit access to the contents of an optical disk media, in accordance with an embodiment of the present invention.

FIG. 7 illustrates a procedure to permit access to the contents of an optical disk medium, in accordance with an embodiment of the present invention. Computer executable program logic is shown in FIG. 7, where many portions of the logic may be similar to those described above with regard to FIG. 6. The computer executable program logic of FIG. 7 may include the additional or alternative operation of decision block 102 where the logic may determine if the content of the optical disk media 38 is authentic once access to the contents of the optical disk media is permitted at decision block 94. The check of authenticity of optical disk media 38 may be by any suitable method, according to the requirements of the particular application. Examples of methods for checking of authenticity include, but are not limited to software passwords, software enable keys, identifying special sectors on the media, encryption, and the like.

Where the content of the optical disk media 38 is determined to not be authentic at decision block 102, the logic proceeds to block 92 where an error message may be generated indicating that the optical disk media 38 within the optical disk drive 30 is not authenticated (e.g., does not match known copyright information) and/or that there is no permission to play this optical disk media 38. Where the content of the optical disk media 38 is determined to be authentic at decision block 102, the logic proceeds to block 98 where permission to play the contents of the optical disk media 38 within the optical disk drive 30 may be given.

Although specific embodiments have been illustrated and described herein for purposes of description of the preferred embodiment, it will be appreciated by those of ordinary skill in the art that a wide variety of alternate and/or equivalent implementations calculated to achieve the same purposes may be substituted for the specific embodiment shown and described without departing from the scope of the present invention. Those with skill in the art will readily appreciate that the present invention may be implemented in a very wide variety of embodiments. This application is intended to cover any adaptations or variations of the embodiments discussed herein. Therefore, it is manifestly intended that this invention be limited only by the claims and the equivalents thereof.

What is claimed is:

1. An apparatus, comprising:
an optical disk drive;
a drive housing containing the optical disk drive;
a radio-frequency identification (RFID) reader co-located within the drive housing with the optical disk drive, or integrated with the optical disk drive; and
an RFID tag located opposite the RFID reader, the RFID tag positioned to be obscured from detection by the RFID reader when an optical disk media is within the optical disk drive, wherein the RFID tag is located on a housing dock portion of the drive housing.

2. The apparatus of claim 1, wherein the drive housing includes a stationary housing base.

3. The apparatus of claim 2, wherein the RFID reader is located on the housing base portion of the drive housing.

4. The apparatus of claim 1, further comprising an optical disk media having a second RFID tag located thereon, the second RFID tag positioned to be opposite the RFID reader when the optical disk media is within the optical disk drive.

5. The apparatus of claim 1, wherein the housing dock is openable.

6. A system comprising:
an apparatus, comprising:
optical disk drive,
a drive housing containing the optical disk drive,
a radio-frequency identification (RFID) reader co-located with the optical disk drive within the drive housing or integrated with the optical disk drive; and
a RFID tag located opposite the RFID reader, the RFID tag positioned to be obscured from the RFID reader when an optical disk media is within the optical disk drive;
a bus coupled to the apparatus; and
a mass storage coupled to the bus.

7. The system of claim 6, wherein the system is selected from the group consisting of a set-top box, a digital camera, a CD player, a DVD player, a wireless mobile phone, a tablet computing device, and a laptop computing device.

8. The system of claim 6, further comprising an optical disk media having a second RFID tag located thereon, the second RFID tag positioned to be opposite the RFID reader when the optical disk media is within the optical disk drive.

9. A system, comprising:
an apparatus, comprising:
an optical disk drive,
a drive housing containing the optical disk drive, and
a radio-frequency identification (RFID) reader co-located with the optical disk drive within the drive housing or integrated with the optical disk drive;
a bus coupled to the apparatus; and
a mass storage coupled to the bus;
wherein the RFID tag is a Fabric RFID tag.

* * * * *